United States Patent
Danicich et al.

(10) Patent No.: US 12,323,685 B2
(45) Date of Patent: Jun. 3, 2025

(54) POSITIONAL LENS LOCKING

(71) Applicant: Rosemount Aerospace Inc., Burnsville, MN (US)

(72) Inventors: Jeffrey Danicich, Savage, MN (US); Curtis J. Wicks, Deerfield Beach, FL (US)

(73) Assignee: Rosemount Aerospace Inc., Burnsville, MN (US)

( * ) Notice: Subject to any disclaimer, the term of this patent is extended or adjusted under 35 U.S.C. 154(b) by 251 days.

(21) Appl. No.: 18/081,879

(22) Filed: Dec. 15, 2022

(65) Prior Publication Data

US 2024/0205524 A1    Jun. 20, 2024

(51) Int. Cl.
| | |
|---|---|
| *H04N 23/52* | (2023.01) |
| *H04N 23/51* | (2023.01) |
| *H04N 23/55* | (2023.01) |
| *H04N 23/57* | (2023.01) |

(52) U.S. Cl.
CPC .............. *H04N 23/52* (2023.01); *H04N 23/51* (2023.01); *H04N 23/55* (2023.01); *H04N 23/57* (2023.01)

(58) Field of Classification Search
CPC ........ H04N 23/52; H04N 23/51; H04N 23/57; H04N 23/55
See application file for complete search history.

(56) References Cited

U.S. PATENT DOCUMENTS

| | | | |
|---|---|---|---|
| 4,168,897 | A | 9/1979 | Gates |
| 5,812,887 | A | 9/1998 | Nomura et al. |
| 7,187,508 | B2 | 3/2007 | Chiang |
| 2005/0219720 | A1 | 10/2005 | Yura et al. |
| 2020/0041874 | A1* | 2/2020 | Nakamura ............. G02B 7/022 |

FOREIGN PATENT DOCUMENTS

| | | |
|---|---|---|
| CN | 107942467 B | 12/2020 |
| EP | 3179307 A1 | 6/2017 |
| EP | 3822701 A1 | 5/2021 |
| WO | 0052510 A1 | 9/2000 |

OTHER PUBLICATIONS

Extended European Search Report for European Patent Application #23211149.2, dated May 21, 2024, 7 pages.

* cited by examiner

*Primary Examiner* — Nicholas G Giles
(74) *Attorney, Agent, or Firm* — Kinney & Lange, P.A.

(57) ABSTRACT

A positional lens locking assembly for focusing and maintaining focus of a camera lens assembly includes a lens tube, a camera housing, a sealing member, and a locking member. The lens tube has a head and a barrel. The head extends outward from the barrel and the barrel has a threaded portion. The camera housing has a first threaded bore configured to receive the threaded portion of the barrel. The sealing member is disposed between the head and the camera housing and is configured to be compressed between the head and the camera housing. The locking member is configured to retain the lens tube in a position.

17 Claims, 2 Drawing Sheets

POSITIONAL LENS LOCKING

BACKGROUND

The present disclosure relates generally to a camera for aircraft applications and more particularly to lens tube mounting.

It is important to be able to focus a lens assembly via lens tube adjustment and positional locking during the manufacture of custom cameras for aircraft cabins or similar applications. The process of lens tube adjustment and locking can be time consuming and difficult. Rotating a threaded lens tube in a threaded bore of a camera housing can require repeated readjustment due to a clearance between threads. For example, a 5 degree over-rotation inward to focus may require a 10 degree outward rotation for correction because the clearance in the thread is biased to the opposite direction. The clearance in the thread is unavoidable even if tightly controlled and can result in the 5 degree shift in rotation without changing focus. A rotation dampener, such as O-ring, disposed around threads of the lens tube can aid in focusing, however, tactile feedback can vary depending on the direction of rotation as the rotation dampener is compressed and relaxed.

It is additionally important to ensure that moisture is kept out of an image sensor area directly below the lens tube during operation. Sealing mechanisms are vital particularly for cameras that may be exposed to aerospace environmental requirements regarding moisture intrusion and susceptibility.

New moisture resistant, camera lens tube interface designs that offer ease of focus adjustment and positional locking are needed.

SUMMARY

In one aspect, a positional lens locking assembly for focusing and maintaining focus of a camera lens assembly includes a lens tube, a camera housing, a sealing member, and a locking member. The lens tube has a head and a barrel. The head extends outward from the barrel and the barrel has a threaded portion. The camera housing has a first threaded bore configured to receive the threaded portion of the barrel. The sealing member is disposed between the head and the camera housing and is configured to be compressed between the head and the camera housing. The locking member is configured to retain the lens tube in a position.

In another aspect, a method of focusing and locking a lens tube of a camera assembly in position includes rotating the lens tube in a camera housing toward or away from an image sensor until an image is in focus, wherein the lens tube is in a position of focus when the image is in focus; and locking the lens tube in the position of focus. Rotating the lens tube includes engaging threads of the lens tube with threads of a first bore in a camera housing. Locking the lens tube in the position of focus includes fixing the threads of the first bore against threads of the lens tube.

The present summary is provided only by way of example, and not limitation. Other aspects of the present disclosure will be appreciated in view of the entirety of the present disclosure, including the entire text, claims and accompanying figures.

Figure 1:
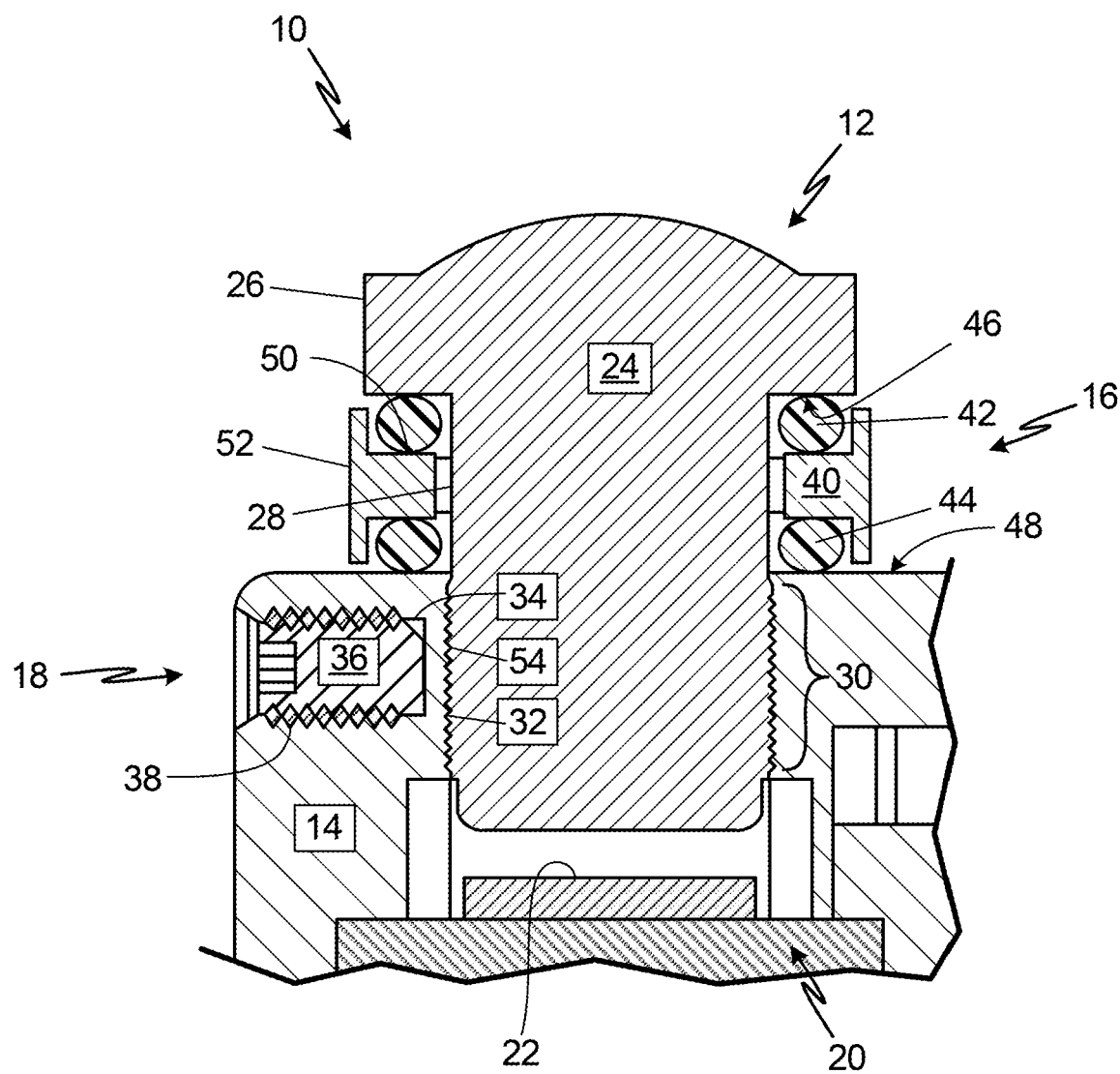
FIG. 1 is a simplified cross-sectional view of a positional lens locking assembly.

While the above-identified figure sets forth one embodiment of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figure may not be drawn to scale, and applications and embodiments of the present invention may include features and components not specifically shown in the drawings.

DETAILED DESCRIPTION

FIG. 1 is a simplified cross-sectional view of positional lens locking assembly 10. Lens assembly 12, camera housing 14, sealing mechanism 16, positional locking mechanism 18, and camera assembly 20 are shown. Camera housing 14 contains camera assembly 20 and is configured to receive lens assembly 12. Camera assembly 20 includes image sensor 22. Lens assembly 12 includes lens tube 24. Lens tube 24 can include head 26 and barrel 28. Barrel 28 can include threaded portion 30. Camera housing 14 includes lens tube bore 32 and positional locking mechanism 18. Positional locking mechanism 18 can include locking bore 34, fastener 36, and threaded insert 38. Sealing mechanism 16 can include lens tube ring 40 and elastomeric members 42 and 44.

Positional lens locking assembly 10 provides a relatively easy means for focusing and fixing lens assembly 12 while providing moisture intrusion resistance. Lens tube 24 is received in lens tube bore 32 of camera housing 14. Lens tube bore 32 can be threaded and configured to receive threaded portion 30 of lens tube 24. During a manufacturing process, lens assembly 12 is focused by rotating lens tube 24 clockwise and/or counterclockwise in lens tube bore 32 toward and/or away from image sensor 22 until an image appears in focus. Sealing mechanism 16 is compressed between surfaces of lens tube 24 and camera housing 14 and holds lens tube 24 in tension during rotation of lens tube 24. Sealing mechanism 16 allows the adjustment of focus inward and outward without hysteresis by maintaining lens tube 24 in tension. As lens tube 24 is rotated, sealing mechanism 16 can provide appropriate resistance to enable case of minute adjustments with temporary anti-rotation hold once torquing force is removed. When a clear image is obtained, lens tube 24 is in a position of focus. Lens tube 24 can be locked in the position of focus with positional locking mechanism 18 as discussed further herein. The combination of sealing mechanism 16 and positional locking mechanism 18 can improve case of focusing, provide secure positional locking of lens tube 24, and provide a water-tight seal to protect camera assembly 20 during use.

For purpose of the disclosure, lens tube 24 is treated as a single unit, as shown in FIG. 1. It will be understood by one of ordinary skill in the art that lens tube 24 includes multiple parts, including a series of stacked lenses. Lens tube 24 can include head 26 and barrel 28. Head 26 is disposed at an end of barrel 28 opposite camera housing 14 when assembled. Head 26 extends radially outward from barrel 28 relative to an axis of lens tube 24. Head 26 includes surface 46 disposed in a plane perpendicular to the lens tube axis. Surface 46 faces camera housing 14 upon assembly. Surface 46 is configured to interface with sealing mechanism 16. Surface 46 can be flat to improve a scaling interaction with sealing mechanism 16. Barrel 28 includes threaded portion 30. Threaded portion 30 is configured for threaded engagement with lens tube bore 32 of camera housing 14.

Sealing mechanism 16 is disposed around barrel 28 between head 26 and camera housing 14. Sealing mechanism 16 includes at least one annular elastomeric member 42, 44 configured to be compressed between surface 46 of head 26 and camera housing 14 to provide a seal against moisture intrusion. Camera housing 14 includes surface 48, which faces surface 46 of head 26 and is configured to interface with sealing mechanism 16. Elastomeric member 42, 44 can be, for example, an O-ring. As shown in FIG. 1, sealing mechanism can include lens tube ring 40 and annular elastomeric members 42 and 44. Lens tube ring 40 is disposed around barrel 28 and between elastomeric members 42 and 44. Lens tube ring is configured to retain elastomeric members 42 and 44 between head 26 and camera housing 14 and provide a seal therebetween.

Lens tube ring 40 can have an inner diameter greater than an outer diameter of barrel 28 to allow lens tube 24 to be slidingly received on barrel 28. Lens tube ring 40 can be sized to locate elastomeric members 42 and 44 directly between head 26 and camera housing 14 such that elastomeric member 42 is compressed between head 26 and lens tube ring 40 and elastomeric member 44 is compressed between lens tube ring 40 and camera housing 14. Elastomeric member 42 provides a seal against moisture intrusion between surface 46 of head 26 and lens tube ring 40. Elastomeric member 44 provides a seal between surface 48 of camera housing 14 and lens tube ring 40.

Lens tube ring 40 can have a T-shaped cross-section to seat and retain elastomeric members 42 and 44. Lens tube ring 40 can include seating portion 50, forming a stem of the T, and retention portion 52, forming a top of the T. Seating portion 50 is annular and extends perpendicular to and outward from barrel 28 to retention portion 52. Elastomeric members 42 and 44 are seated on opposite sides of seating portion 50. Retention portion 52 extends parallel to barrel 28. Retention portion 52 is configured to retain elastomeric members 42 and 44 in a radial location relative to the axis of lens tube 24 to ensure that head 26 engages a full annular surface of elastomeric member 42. Elastomeric member 42 is disposed between retention portion 52 and a first side of seating portion 50. Elastomeric member 44 is disposed between retention portion 52 and a second, opposite, side of seating portion 50. Retention portion 52 can be annular.

Retention portion 52 can extend less than a full thickness of elastomeric members 42 and 44 to allow unrestrained compression of elastomeric members 42 and 44. For example, retention portion 52 can be sized to retain a radial position of elastomeric members 42 and 44 without engaging surface 46 of head 26 and/or surface 48 of camera housing 14 as elastomeric members 42 and 44 are compressed. In some embodiments, retention portion 52 can be disposed radially outward of head 26 relative to the axis of lens tube 24 to prevent engagement between retention portion 52 and head 26.

Oppositely disposed first and second sides of seating portion 50 can be flat to improve a seal between elastomeric members 42 and 44 and lens tube ring 40. Seating portion 50 and/or elastomeric members 42 and 44 can have a thickness designed to optimize scaling and focusing of lens assembly 12. For example, seating portion 50 and/or elastomeric members 42 and 44 can be designed with a thickness necessary to hold lens tube 24 in tension during a focusing operation and to provide a watertight seal in the position of focus. Lens tube ring 40 can be formed of any suitable material, including, for example, aluminum. Elastomeric members 42 and 44 can be formed of any suitable material capable of elastic deformation.

Once a clear image is obtained, lens tube 24 can be locked in the position of focus with positional locking mechanism 18. Positional locking mechanism 18 can include fastener 36 and locking bore 34. Fastener 36 is received in locking bore 34 and configured to press threads of lens tube bore 32 against threaded portion 30 of lens tube 24. Fastener 36 can be a threaded fastener such as a screw or bolt. As shown in FIG. 1, fastener 36 can be a set screw.

Locking bore 34 extends into camera housing 14 toward and perpendicular to lens tube bore 32. Locking bore 34 is not a through hole but can extend nearly to lens tube bore 32, leaving a relatively thin wall 54 between locking bore 34 and lens tube bore 32. Fastener 36 is received in locking bore 34 and can engage a back side of wall 54 opposite a threaded side of lens tube bore 32. Fastener 36 can apply a force against wall 54 causing wall 54 to deform and fixing the threads of lens tube bore 32 against threads of lens tube 24. Wall 54 can have a thickness designed to prevent permanent deformation of lens tube bore 32 and to prevent damage to threads on threaded portion 30 of lens tube 24. Wall 54 of locking bore 34 allows for locking a position of lens tube 24 while preventing moisture from entering lens tube bore 32 and camera assembly 20.

In some embodiments, positional locking mechanism 18 can include threaded insert 38. Threaded insert 38 can be a locking or a non-locking insert. In some embodiments, threaded insert 38 can be a thread locking insert, including but not limited to a locking helical insert, configured to lock a position of fastener 36.

Positional locking mechanism 18 can provide a reversible mechanical lock for lens tube 24. For example, fastener 36 can be loosened or removed to release a force against wall 54 and lens tube 24 can be replaced or rotated to adjust the focus. Fastener can be tightened again to lock lens tube 24 in the new position of focus.

In some embodiments, two or more positional locking mechanisms 18 can be provided to lock lens tube 24 in the position of focus. For example, two or more locking bores 34 and fasteners 36 can be provided in camera housing 14 and configured to fix threads of lens tube bore 32 to threads of lens tube 24 in different locations around barrel 28. Positional locking mechanisms 18 can be spaced circumferentially around barrel 28 in camera housing 14.

In some embodiments, locking mechanism can include an adhesive or locking compound (not shown) configured to lock threaded portion 30 of lens tube 24 in lens tube bore 32. For example, a locking compound can be applied to threaded portion 30 of lens tube 24 or to threads of lens tube bore 32. The locking compound can allow rotation of lens tube 24 in lens tube bore 32 in a focusing operation and can lock lens tube 24 in the position of focus upon curing.

Figure 2:
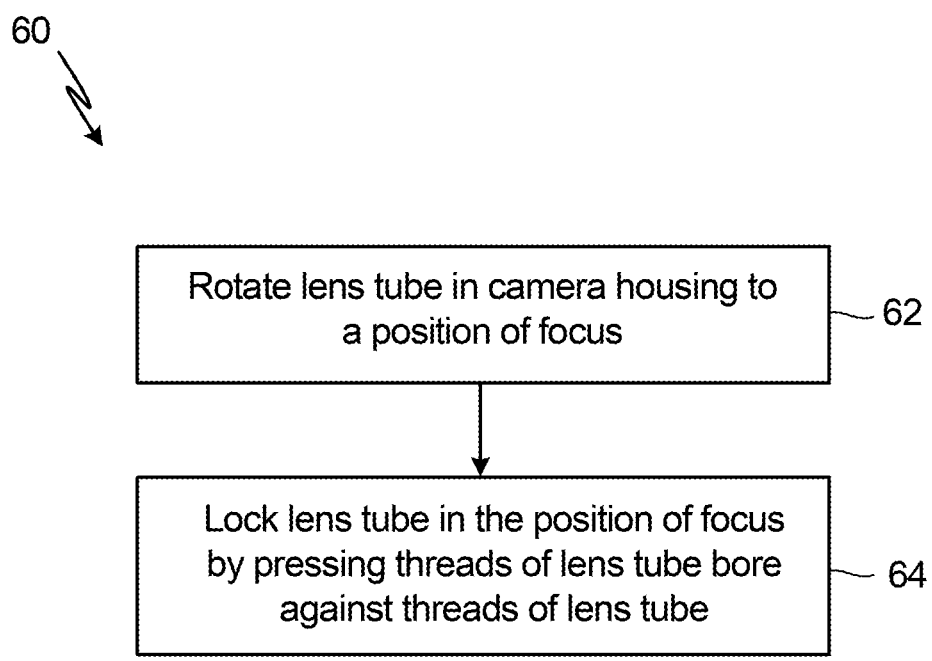
FIG. 2 is a flowchart of a method for focusing and locking a lens tube during manufacture of a camera assembly of FIG. 1.

FIG. 2 is a flowchart of method 60 for focusing and locking lens tube 24 during manufacture of the camera assembly. Step 62 includes rotating lens tube 24 in camera housing 14 toward or away from image sensor 22 until an image is in focus. The lens tube is in a position of focus when the image is in focus. Rotating lens tube 24 engages threads of lens tube 24 with threads of lens tube bore 32 in camera housing 14 and engages one or more elastomeric members 42 and 44 between surfaces of lens tube 24 and camera housing 14. As shown in FIG. 1, elastomeric members 42 and 44 are disposed on opposite sides of lens tube ring 40 and compressed between head 26 and lens tube ring 40 and between lens tube ring 40 and camera housing 14, respectively. Elastomeric members 42 and 44 hold lens tube 24 in tension and provide resistance to enable case of minute adjustments of lens tube 24 while also providing temporary anti-rotation hold once the torquing force is removed. Elastomeric members 42 and 44 allow adjustment of focus without hysteresis by maintaining lens tube 24 in tension. Step 64 includes locking lens tube 24 in the position of focus. Locking lens tube 24 can include fixing threads of lens tube bore 32 against threads of lens tube 24 by applying a force with fastener 36 against a back side of lens tube bore 32 (i.e., wall 54) and/or by allowing an adhesive or locking compound to cure. Fastener 36 can be rotated in locking bore 34 until an end of fastener 36 meets wall 54 of locking bore 34 and presses against wall 54 causing wall 54 to protrude into lens tube bore 32 thereby pressing threads of lens tube bore 32 against threads of lens tube 24.

The disclosed positional lens locking assembly can improve focusing by enabling case of minute adjustments with a temporary anti-rotation hold, can provide secure positional locking of a lens tube, and can provide a watertight seal to protect a camera assembly during use.

It will be understood by one of ordinary skill in the art that the disclosed focusing, scaling, and locking mechanisms can be designed for use with a variety of camera and lens assemblies and are not limited to use with any particular lens or camera assembly.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person having ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A positional lens locking assembly for focusing and maintaining focus of a camera lens assembly includes a lens tube, a camera housing, a sealing member, and a locking member. The lens tube has a head and a barrel. The head extends outward from the barrel and the barrel has a threaded portion. The camera housing has a first threaded bore configured to receive the threaded portion of the barrel. The sealing member is disposed between the head and the camera housing and is configured to be compressed between the head and the camera housing. The locking member is configured to retain the lens tube in a position.

The positional lens locking assembly of the preceding paragraph can optionally include, additionally and/or alternatively, any one or more of the following features, configurations and/or additional components:

In an embodiment of the foregoing positional lens locking assembly, the sealing member can be an O-ring, which can be disposed around the barrel.

In an embodiment of any of the foregoing positional lens locking assemblies, the sealing member can include a lens tube ring disposed around the barrel between the head and the camera housing, a first O-ring disposed between the head and the lens tube ring, a second O-ring disposed between the lens tube ring and the camera housing.

In an embodiment of the foregoing positional lens locking assembly, the lens tube ring can have a seating portion and a retention portion. The seating portion can extend perpendicular to and outward from the barrel to the retention portion. The retention portion can extend parallel to the barrel. The first O-ring can be disposed between the retention portion and a first side of the seating portion and the second O-ring can be disposed between the retention portion and a second side of the seating portion.

In an embodiment of the foregoing positional lens locking assembly, the locking member can include a threaded fastener configured to press a portion of the first threaded bore of the camera housing against the threaded portion of the barrel.

In an embodiment of the foregoing positional lens locking assembly, the camera housing can include a second threaded bore configured to receive the threaded fastener. The second threaded bore can have an inner end disposed on a back side of the portion of first threaded bore configured to be pressed against the threaded portion of the barrel.

In an embodiment of the foregoing positional lens locking assembly, the second threaded bore can be oriented perpendicular to the first threaded bore.

In an embodiment of the foregoing positional lens locking assembly, the locking member can further include a threaded insert, the threaded insert can be disposed in the second threaded bore and configured to receive the threaded fastener.

In an embodiment of the foregoing positional lens locking assembly, the threaded insert can be a thread locking insert.

An embodiment of the foregoing positional lens locking assembly can further include a plurality of locking members and a corresponding plurality of second threaded bores. The plurality of locking members can be circumferentially spaced around the threaded barrel.

In an embodiment of the foregoing positional lens locking assembly, the first O-ring can be compressed between surfaces of the head and the lens tube ring and the second O-ring can be compressed between surfaces of the lens tube ring and the camera housing.

In an embodiment of the foregoing positional lens locking assembly, the lens tube can be in tension.

A method of focusing and locking a lens tube of a camera assembly in position includes rotating the lens tube in a camera housing toward or away from an image sensor until an image is in focus, wherein the lens tube is in a position of focus when the image is in focus; and locking the lens tube in the position of focus. Rotating the lens tube includes engaging threads of the lens tube with threads of a first bore in a camera housing. Locking the lens tube in the position of focus includes fixing the threads of the first bore against threads of the lens tube.

The method of the preceding paragraph can optionally include, additionally and/or alternatively, any one or more of the following features, configurations, additional components, and/or steps:

In an embodiment of the foregoing method, rotating the lens tube further comprises engaging a sealing member between surfaces of the lens tube and the camera housing.

In an embodiment of the foregoing method, fixing the threads of the first bore against threads of the lens tube can include pressing the threads of the first bore against the threads of the lens tube by applying a force, with a threaded fastener, against a back side of the first bore.

An embodiment of any of the foregoing methods can further include engaging the threaded fastener with a threaded insert disposed in a second bore of the camera housing. The second bore can extend to the back side of the first bore.

In an embodiment of any of the foregoing methods, the threaded insert can be a thread locking insert.

In an embodiment of any of the foregoing methods, the first bore can be deformed in the location force is applied by the threaded fastener.

In an embodiment of any of the foregoing methods, the sealing member can include a first O-ring compressed between the surface of the lens tube and a lens tube ring and a second O-ring compressed between the surface of the camera housing and the lens tube ring. The first and second O-rings can be separated by the lens tube ring and wherein the surface of the lens tube can face the surface of the camera housing.

In an embodiment of any of the foregoing methods, the lens tube can have—a seating portion and a retention portion. The seating portion can extend outward from and perpendicular to the lens tube to the retention portion. The retention portion can extend parallel to the lens tube. The first and second O-rings can be disposed between the retention portion and opposite sides of the seating portion.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A positional lens locking assembly for focusing and maintaining focus of a camera lens assembly, the positional lens locking assembly comprising:
    a lens tube having a head and a barrel, wherein the head extends outward from the barrel and wherein the barrel has a threaded portion;
    a camera housing having a first threaded bore configured to receive the threaded portion of the barrel;
    a sealing member disposed between the head and the camera housing, the sealing member configured to be compressed between the head and the camera housing; and
    a locking member configured to retain the lens tube in a position, wherein the locking member comprises a threaded fastener configured to press threads of the threaded bore of the camera housing against the threaded portion of the barrel.

2. The positional lens locking assembly of claim 1, wherein the sealing member is an O-ring, the O-ring disposed around the barrel.

3. The positional lens locking assembly of claim 1, wherein the sealing member comprises:
    a lens tube ring disposed around the barrel between the head and the camera housing;
    a first O-ring disposed between the head and the lens tube ring; and
    a second O-ring disposed between the lens tube ring and the camera housing.

4. The positional lens locking assembly of claim 3, wherein the lens tube ring has a seating portion and a retention portion, the seating portion extending perpendicular to and outward from the barrel to the retention portion, the retention portion extending parallel to the barrel, wherein the first O-ring is disposed between the retention portion and a first side of the seating portion and the second O-ring is disposed between the retention portion and a second side of the seating portion.

5. The positional lens locking assembly of claim 1, wherein the camera housing comprises a second threaded bore configured to receive the threaded fastener, the second threaded bore having an inner end disposed on a back side of the portion of first threaded bore configured to be pressed against the threaded portion of the barrel.

6. The positional lens locking assembly of claim 5, wherein the second threaded bore is oriented perpendicular to the first threaded bore.

7. The positional lens locking assembly of claim 5, wherein the locking member further comprises a threaded insert, the threaded insert disposed in the second threaded bore and configured to receive the threaded fastener.

8. The positional lens locking assembly of claim 7, wherein the threaded insert is a thread locking insert.

9. The positional lens locking assembly of claim 5 and further comprising a plurality of locking members and a corresponding plurality of second threaded bores, the plurality of locking members circumferentially spaced around the threaded barrel.

10. The positional lens locking assembly of claim 3, wherein the first O-ring is compressed between surfaces of the head and the lens tube ring and the second O-ring is compressed between surfaces of the lens tube ring and the camera housing.

11. The positional lens locking assembly of claim 3, wherein the sealing member is sized to hold the lens tube in tension during an operation of rotating the lens tube toward and away from an image sensor to bring an image into focus.

12. A method of focusing and locking a lens tube of a camera assembly in position, the method comprising:
    rotating the lens tube in a camera housing toward or away from an image sensor until an image is in focus, wherein the lens tube is in a position of focus when the image is in focus and wherein the lens tube is maintained in tension as the lens tube is rotated; and
    locking the lens tube in the position of focus;
    wherein rotating the lens tube comprises:
        engaging threads of the lens tube with threads of a first bore in a camera housing; and
        engaging a sealing member between surfaces of the lens tube and the camera housing
    wherein locking the lens tube in the position of focus comprises fixing the threads of the first bore against threads of the lens tube by applying a force, with a threaded fastener, against a back side of the first bore to press the threads of the first bore against the threads of the lens tube.

13. The method of claim 12 and further comprising engaging the threaded fastener with a threaded insert disposed in a second bore of the camera housing, the second bore extending to the back side of the first bore.

14. The method of claim 13, wherein the threaded insert is a thread locking insert.

15. The method of claim 12 wherein the first bore is deformed in the location force is applied by the threaded fastener.

16. The method of claim 12 wherein the sealing member comprises:
   a first O-ring compressed between the surface of the lens tube and a lens tube ring; and
   a second O-ring compressed between the surface of the camera housing and the lens tube ring;
   wherein the first and second O-rings are separated by the lens tube ring and wherein the surface of the lens tube faces the surface of the camera housing.

17. The method of claim 16, wherein the lens tube has a seating portion and a retention portion, the seating portion extending outward from and perpendicular to the lens tube to the retention portion, the retention portion extending parallel to the lens tube, and wherein the first and second O-rings are disposed between the retention portion and opposite sides of the seating portion.

* * * * *